(12) United States Patent
Satapathy

(10) Patent No.: US 9,330,156 B2
(45) Date of Patent: May 3, 2016

(54) SYSTEM AND METHOD FOR SOFTWARE DEFINED NETWORK AWARE DATA REPLICATION

(71) Applicant: CISCO TECHNOLOGY, INC., San Jose, CA (US)

(72) Inventor: Soumendu Satapathy, Rourkela (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 273 days.

(21) Appl. No.: 14/057,431

(22) Filed: Oct. 18, 2013

(65) Prior Publication Data

US 2015/0112933 A1    Apr. 23, 2015

(51) Int. Cl.
 *G06F 17/00* (2006.01)
 *G06F 17/30* (2006.01)
 *H04L 12/24* (2006.01)
 *H04L 29/08* (2006.01)

(52) U.S. Cl.
CPC ...... *G06F 17/30575* (2013.01); *H04L 41/0896* (2013.01); *H04L 41/5019* (2013.01); *H04L 67/1095* (2013.01); *H04L 67/1097* (2013.01)

(58) Field of Classification Search
CPC ....................................................... G06F 17/30
USPC ................................................. 707/600–899
See application file for complete search history.

(56) References Cited

U.S. PATENT DOCUMENTS

| | | | |
|---|---|---|---|
| 2009/0132825 A1 | 5/2009 | Mohanty | |
| 2010/0179941 A1* | 7/2010 | Agrawal | ............. G06F 11/1451 707/624 |
| 2012/0177039 A1 | 7/2012 | Berman | |
| 2012/0177041 A1 | 7/2012 | Berman | |
| 2012/0177042 A1 | 7/2012 | Berman | |
| 2012/0177043 A1 | 7/2012 | Berman | |
| 2012/0177044 A1 | 7/2012 | Berman | |
| 2012/0177045 A1 | 7/2012 | Berman | |
| 2012/0177370 A1 | 7/2012 | Berman | |

(Continued)

FOREIGN PATENT DOCUMENTS

WO    WO 2015/057960    4/2015

OTHER PUBLICATIONS

Cisco, "Cisco Prime Data Center Network Manager 6.1," At-A-Glance, © 2012, 3 pages; http://www.cisco.com/en/US/prod/collateral/netmgtsw/ps6505/ps9369/at_a_glance_c45-708883.pdf.

(Continued)

*Primary Examiner* — Isaac M Woo
(74) *Attorney, Agent, or Firm* — Patent Capital Group

(57) ABSTRACT

An example method is provided in one example embodiment and includes establishing software defined network (SDN) awareness for a data replication application; establishing data replication awareness for a SDN controller; managing a plurality of logical networks in a wide area network (WAN) between each of a plurality of source filers and each of a plurality of destination filers for each of a plurality of data types by the SDN controller having data replication awareness, wherein each logical network is associated with a replication policy for a corresponding source filer and is connected to the corresponding source filer through a logical interface; and transmitting replication data between each of the plurality of source filers and each of the plurality of destination filers using each of the plurality of logical networks.

20 Claims, 6 Drawing Sheets

(56) References Cited

U.S. PATENT DOCUMENTS

2012/0269053 A1 10/2012 Yu et al.
2013/0028135 A1 1/2013 Berman
2014/0365622 A1 12/2014 Iyengar et al.

OTHER PUBLICATIONS

Cisco, "Cisco Prime Data Center Network Manager," Release 6.1 Data Sheet, © 2012, 10 pages; http://www.cisco.com/en/US/prod/collateral/netmgtsw/ps6505/ps9369/data_sheet_c78-639737.html.
Coraid, "Coraid EtherCloud™," Solution Brief, © 2013, 2 pages; http://san.coraid.com/rs/coraid/images/SB-Coraid_EtherCloud.pdf.
Coraid, "The Fundamentals of Software-Defined Storage," Solution Brief, © 2013, 3 pages; http://san.coraid.com/rs/coraid/images/SB-Coraid_SoftwareDefinedStorage.pdf.
Brocade Communications Systems, "Network Transformation with Software-Defined Networking and Ethernet Fabrics," Positioning Paper, © 2012, 6 pages; http://www.brocade.com/downloads/documents/positioning-papers/network-transformation-sdn-wp.pdf.
IBM, Redbooks, "Introduction to Storage Area Networks and System Networking," Nov. 17, 2012, 2 pages; http://www.redbooks.ibm.com/abstracts/sg245470.html.
Open Networking Foundation, "Software-Defined Networking: The New Norm for Networks," White Paper, Apr. 13, 2012, 12 pages; http://www.bigswitch.com/sites/default/files/sdn_resources/onf-whitepaper.pdf.
Jeda Networks, "Software Defined Storage Networks an Introduction," White Paper, Doc # 01-000030-001 Rev. A, Dec. 12, 2012, 8 pages; http://jedanetworks.com/wp-content/uploads/2012/12/Jeda_Networks_SDSN.pdf.
Joseph F. Kovar, "Startup Jeda Networks Takes SDN Approach to Storage Networks," CRN Press Release, Feb. 22, 2013, 1 page; http://www.crn.com/240149244/printablearticle.htm.
Emulex and Brocade Communications Systems, "Storage Area Network—NPIV: Emulex Virtual HBA and Brocade, Proven Interoperability and Proven Solution," Technical Brief, © 2008, 4 pages; http://www.emulex.com/artifacts/5028d655-732a-452d-8bbb-2f27d2fa55c5/Emulex_Brocade_NPIV.pdf.
Coraid, Storage Infrastructure for the Cloud, Solution Brief, © 2012, 3 pages; http://san.coraid.com/rs/coraid/images/SB-Coraid_CloudStorageInfrastructure.pdf.
StorageNewsletter.com, "Start-Up Jeda Networks in Software Defined Storage Network Technology," Press Release, Feb. 25, 2013, 2 pages; http://www.storagenewsletter.com/news/startups/jeda-networks.
PCT Jan. 23, 2015 International Search Report and Written Opinion from International Application No. PCT/US2014/060899.
"Data ONTAP 8.2 Data Protection Online Backup and Recovery Guide for 7-Mode," May 1, 2013, XP055162266 https://library.netapp.com/ecm/ecm_download_file/ECMP1196991.
Hong, Chi-Yao, et al., "Achieving High Utilization with Software-driven WAN," SIGCOMM 2013 Conference, Aug. 12-16, 2013, Hong Kong, China; Proceedings published by ACM SIGCOMM, New York, NY.
Jain, Sushant, et al., "B4: Experience with a Globally Deployed Software Defined WAN," SIGCOMM 2013 Conference, Aug. 12-16, 2013, Hong Kong, China; Proceedings published by ACM SIGCOMM, New York, NY.
Kerner, Sean Michael, "OpenFlow Inventor Martin Casado on SDN, VMWare and Software Defined Networking Hype," Video, Apr. 29, 2013, XP055162306, Enterprising Working Planet http://www.enterprisenetworkingplanet.com/print/netsp/openflow-inventor-martin-casado-sdn-vmware-software-defined-networking-video.html.
Limoncelli, Thomas A., "OpenFlow; A Radical New Idea in Networking," QUEUE, vol. 10, No. 6; Jun. 6, 2012, pp. 40-46.

\* cited by examiner

SYSTEM AND METHOD FOR SOFTWARE DEFINED NETWORK AWARE DATA REPLICATION

TECHNICAL FIELD

This disclosure relates in general to the field of communications and, more particularly, to a system and method for software defined network (SDN) aware data replication.

BACKGROUND

As elastic cloud architectures and dynamic resource allocation evolve and as usage of mobile computer operating systems and virtual machines grows, Software-Defined Networking (SDN) has gained increasing relevance in networking systems. SDN is an approach to building computer networking equipment and software that separates and abstracts the control plane and data plane of networking systems. SDN decouples the control plane that makes decisions about where traffic is sent from the underlying data plane that forwards traffic to the selected destination. SDN allows network administrators to manage network services through abstraction of lower level functionality into virtual services.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
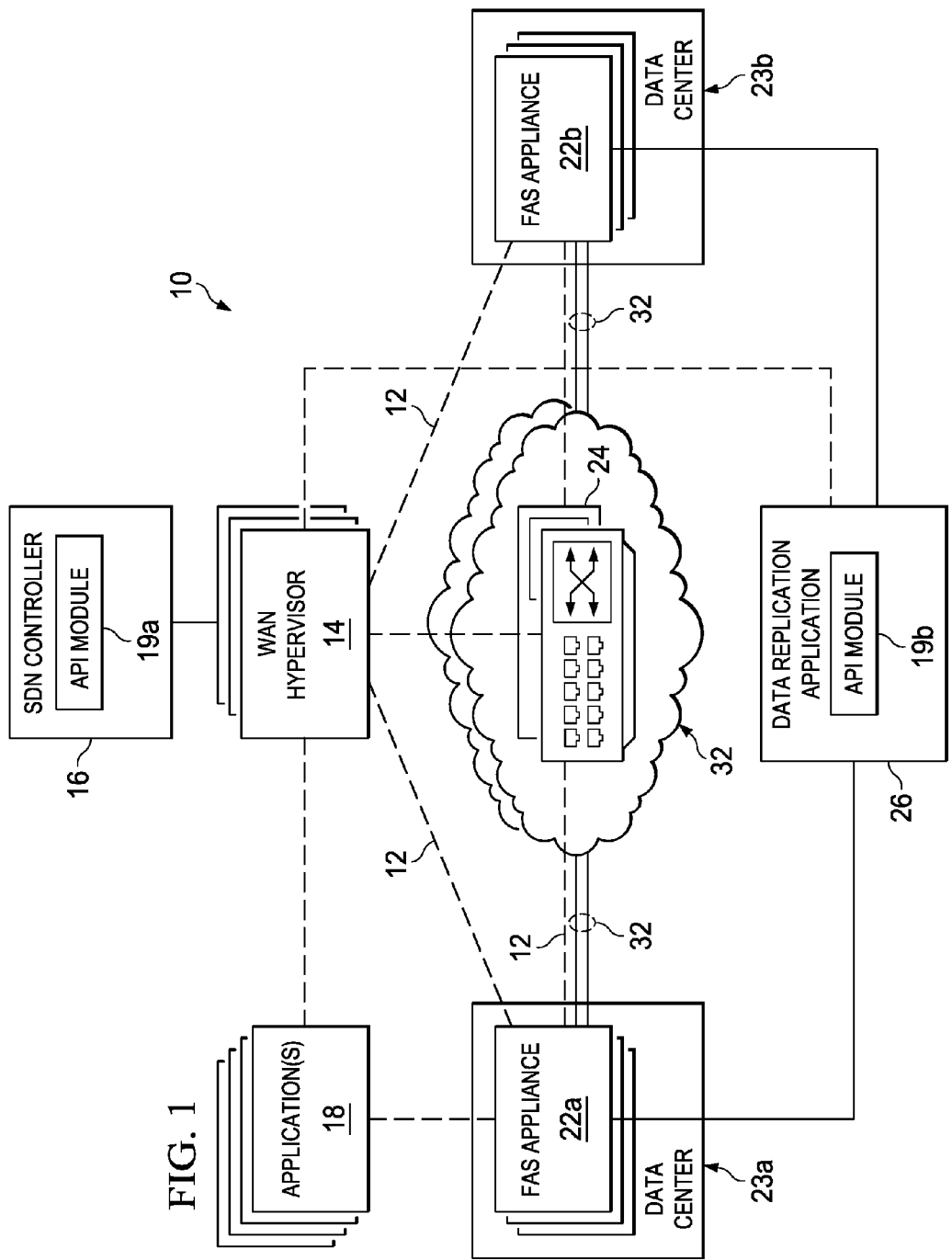
FIG. 1 is a simplified block diagram of a communication system facilitating SDN aware data replication in accordance with one embodiment of the present disclosure.

A method is provided in one example embodiment and can include establishing software defined network (SDN) awareness for a data replication application; establishing data replication awareness for a SDN controller; managing a plurality of logical networks in a wide area network (WAN) between each of a plurality of source filers and each of a plurality of destination filers for each of a plurality of data types by the SDN controller having data replication awareness, wherein each logical network is associated with a replication policy for a corresponding source filer and is connected to the corresponding source filer through a logical interface; and transmitting replication data between each of the plurality of source filers and each of the plurality of destination filers using each of the plurality of logical networks.

In more specific embodiments, establishing SDN awareness for the data replication application can include creating each of the plurality of source filers, wherein each source filer is associated with a particular data type; assigning an Internet Protocol (IP) to each source filer; creating one or more replication relationships for each source filer, wherein each replication relationship includes a Service Level Agreement (SLA) and wherein the SLA includes a Recovery Point Objective (RPO) and a Recovery Time Objective (RTO); and publishing the replication policy for each source filer, wherein the replication policy includes a total number of replication relationships on the source filer, a total number of volumes to be replicated, a total latency requirement, a compression type, a bandwidth requirement, the RPO, and the RTO. In other embodiments, establishing data replication awareness for the SDN controller can include collecting each replication policy for each of the plurality of source filers; creating one or more network rules for each replication policy; and creating a logical network instance using the one or more network rules for each replication policy for each source filer, wherein each logical network instance comprises forwarding plane information for each of a plurality of switches for each of the plurality of logical networks.

In some cases, the method can include querying the SDN controller to determine available bandwidth in the WAN for transmitting replication data for a replication relationship for a particular data type, wherein the query includes a service level agreement (SLA) for the replication relationship; determining a minimum bandwidth for the replication data from the SLA; determining available bandwidth in the WAN for transmitting the replication data for the particular data type by slicing bandwidth for the WAN across data replication traffic and non-data replication traffic; comparing the minimum bandwidth for the replication data to the available bandwidth in the WAN to determine whether bandwidth is available in the WAN for transmitting the replication data; if bandwidth is available in the WAN, disabling compression for the replication data to be transmitted using a particular logical network; and if bandwidth is not available in the WAN, enabling compression for the replication data to be transmitted using the particular logical network. In some instances, the method can include controlling a forwarding plane for each of a plurality of switches in a wide area network (WAN) for each of the plurality of logical networks between a particular source filer and a particular destination filer.

Example Embodiments

Turning to FIG. 1, FIG. 1 is a simplified block diagram of a communication system 10 that facilitates SDN aware data replication activities in accordance with one embodiment of the present disclosure. The example architecture as shown in FIG. 1 includes a wide area network (WAN) 12 (represented by dashed lines) including a WAN hypervisor 14, an SDN controller 16, applications 18, Fabric Attached Storage (FAS) appliances 22*a-b* and switches 24. SDN controller 16 via WAN hypervisor 14 may manage connections between various network elements including FAS appliances 22a-b and switches 24 for one or more logical networks 32, which can be used to transmit data replication traffic from source FAS 22a to destination FAS 22b. Respective API modules 19a-b may be provisioned in SDN controller 16 and data replication application 26.

FAS appliances 22a-b may be identified herein as source FAS appliance 22a (or generally as "source FAS 22a") and a destination FAS appliance 22b (or generally as "destination FAS 22b"). A data replication application 26 may be executed on source FAS 22a and destination FAS 22b to facilitate data replication between the source FAS 22a and the destination FAS 22b. SDN controller 16 may be an application or virtual machine executing on WAN hypervisor 14 in WAN 12. WAN hypervisor 14 may be implemented as a virtual machine in a suitable server or other computing device within WAN 12. In some embodiments, SDN controller 16 may be managed through appropriate management interfaces associated with WAN hypervisor 14.

Source FAS 22a can be serviced at a source data center 23a and destination FAS 22b can be serviced at a destination data center 23b. In some cases, data centers can be geographically separated but connected through a network such as, for example a WAN (e.g., WAN 12), local area networks (LANs), virtual LANS (VLANS), Storage Area Networks (SANs) virtual SANs (VSANs), combinations thereof or the like. It should be understood that the terms "source" and "destination" as used herein are arbitrary designations employed to illustrate various features of communication system 10. The designations of source and destination data centers, appliances, etc. may be reversed to accommodate other implementations.

The term "Fabric Attached Storage" may generally refer to storage attached through a fabric or network (e.g., a LAN, VLAN, SAN, VSAN, etc.). The storage can include tape drives, disk drives, solid state drives, combinations thereof or the like. FAS can be implemented in FAS appliances, such as FAS appliances 22a-b as shown in FIG. 1. FAS can sometimes be referred to as Network Attached Storage (SAN).

Embodiments of communication system 10 may include SDN mechanisms to abstract control of a data replication plane to a network control plane in order to manage data replication flows between FAS appliances 22a-b. As used herein, the term "network control plane" refers to a logical division of network architecture, such as WAN 12, that carries signaling and management traffic (as opposed to the network user's data traffic or data replication traffic). The control plane is responsible for routing decisions (e.g., based on the network topology), which are implemented by the data plane. As used herein, the terms "data plane" or "data replication plane" includes another logical division of network architecture, such as WAN 12, that carries network user data traffic (e.g., data traffic for network applications) or data replication traffic (e.g., data replication traffic between FAS and/or FAS appliances 22a-b or data from network applications to FAS/FAS appliances for replication, backup, etc.). Control plane functions typically include monitoring network throughput and performance, updating the network topology, establishing new connections, and enforcing security and service policies. The concepts of SDN may be extended to data replication activities, as describe herein in the present disclosure.

According to various embodiments, data replication awareness may be established for SDN controller 16 and SDN awareness may be established for data replication application 26 using SDN concepts as an underlying principle. Bringing awareness between SDN controller 16 and data replication application 26 effectively bridges data replication to SDN such that SDN controller 16 and data replication application 26 may leverage SDN concepts for several benefits, including, but not limited to, maintaining proper service level agreement (SLA) compliance, proper utilization of WAN resources, proper Recovery Time Objective (RTO) compliance and proper Recovery Point Objective (RPO) compliance for different mirror/replication relationships as well as increasing data replication performance, increasing data replication efficiency and/or increasing network efficiency. Note that different mirror relationships can have different requirements for RTO and RPO. RPO is the maximum tolerable period for data loss following an unplanned incident or event, such as, example, equipment failure, natural disaster, loss of power, etc. RTO is the duration of time and an associated service level must be restored for an unplanned incident or event. RPO and RTO are typically used by businesses, network operators, etc. to define network rules, algorithms, functions, etc. for managing data replication and/or data recovery mechanisms. For purposes of the present disclosure, the terms "mirror relationship" and "replication relationship" can be used interchangeably.

According to various embodiments, SDN controller 16 and data replication application 26 may be provisioned with respective API modules 19a-b including a set of APIs that may enable SDN controller 16 and data replication application 26 to interface with each other in order to facilitate data replication related activities. The APIs can include functions and associated function calls for interfacing between SDN controller 16 and data replication application 26.

For example, the API modules 19a-b can be provisioned with a "policy publish API" that may be configured with one or more functions/function calls to allow data replication application 26 to send replication policy information (e.g., data replication requirements such as RPO, RTO, etc.) to SDN controller 16. SDN controller 16 may perform various functions in light of the received replication policies including, but not limited to, converting the replication policies networking algorithms, which SDN controller 16 can execute in order to allocate and manage WAN resources for data replication activities. Other APIs may be provisioned in API modules 19a-b, as will be discussed in further detail herein, below.

In various embodiments, SDN controller 16 be provisioned with one or more applications to manage resources for WAN in order to facilitate transmitting data replication traffic across WAN 12. For example, SDN controller 16 may be provisioned with a logical network manager application, which may facilitate creation of one or more logical network instances based on the replication policies and network rules created from the replication policies. A logical network instances may be used to instantiate a logical network through which data replication traffic may be transmitted from source FAS 22a to destination FAS 22b. A logical network, sometimes referred to as a virtual network, may represent an allocation or a portion of a physical network that connects two or more logical network interfaces/devices. A logical interface/device is a software entity that is known by an operating system, or in the case of the present disclosure, SDN controller 16. Logical interfaces as described herein can be used to connect logical networks 32 to filers within FAS appliances 22a-b. Generally, a logical network can be used to organize and/or describe networks with different purposes. According to some embodiments, logical networks can be used to support data replication traffic with different types of SLAs.

According to various embodiments, each logical network instances may have associated thereto: replication policies, including SLAs, one or more network rules configured by SDN controller 16 (and/or an application provided therein) related to allocation of network resources, including bandwidth for WAN 12, forwarding plane information for switches 24, logical interface information, link information, combinations thereof or any other type of information related to managing logical networks for data replication activities. SDN controller 16 can be provisioned with a logical network server application to store information related to logical networks and logical network instances that may be created by the logical network manager application.

As used herein, the term "switch" refers to a network element that can receive packets at various ports, examine the packet headers to determine a source and a destination of the respective packets, and forward the packets to their corresponding destinations. As used herein, a "link" is a communications channel that can connect two or more nodes. In some embodiments, a link can be an actual physical links such as, for example, a cable connecting network devices, elements, etc. In some embodiments, a link can be a logical (e.g., virtual) link that uses one or more actual physical links. The term "interface" as used herein can include communicating, sending, transmitting, receiving, pushing, pulling, gathering, collecting or any other form of sharing information across one or more networks, communication mediums, links or the like.

During data replication activities, one or more logical networks may be instantiated, managed, monitored and/or maintained by SDN controller 16 using various applications contained therein based on replication policies, replication data types, network conditions, equipment state, etc. in order to facilitate transmitting replication data between one or more FAS appliances, such as, for example FAS appliances 22a-b. In this manner, SDN awareness for data replication application 26 and data replication awareness for SDN controller 16 can be established to achieve replication requirements for one or more data replications.

As used herein, the term "network element" can include computers, network appliances, servers, routers, switches, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

Before detailing some of the operational aspects of FIG. 1, it is important to understand common characteristics of data replication between data centers. The following foundation is offered earnestly for teaching purposes only and, therefore should not be construed in any way to limit the broad teachings of the present disclosure.

In data replication software (for example SnapMirror® from NetApp®), volumes containing data are replicated from a source data center to a destination data center, often for disaster recovery purpose. Data replication can also be used for mirroring data to a different site. Often multiple volumes have different types of data to be replicated from a source data center to a destination data center. For example volume A may have video data associated with a video application to be replicated. Volume B may have virtual machine data associated with a virtual machine application to be replicated, and so on. Different data types may need different levels of compression to be applied to it during migration, may have different bandwidth requirement needs, different latency requirements, etc. for replication.

For example, virtual machine data migration may need very low latency data replication network for seamless migration. Other type of data such as text or documents may not need a low latency network. Still yet, some types of data may need high capacity but may not need low latency. Most of the time it may happen that volumes with different types of data have to be replicated from a source to a destination simultaneously by creating a mirror relationship between a source volume and a destination mirror volume.

Data replication applications such as the SnapMirror® application are generally not straight forward applications. These applications typically perform bulk replication by creating hundreds of mirror relationships. Each such relationship can have different SLA requirements. SLA requirements are generally used define RTO, RPO, latency requirements, capacity, data types, compression schemes, etc. Managing such bulk replication with multiple mirror relationships replicating data simultaneously is a cumbersome task.

Further, since WAN bandwidth is costly, native compression of data to be replicated is done at the source and then it is decompressed at the destination. This process not only consumes costly CPU time but also memory. Data compression and decompression time gets added to the latency of the replication.

Data replication time (Tr) from a source data center to a destination data center can be represented as data compression time (Tc) plus data transfer time (T) plus data de-compression time (Td), which can be expressed as:

$$Tr = Tc + T + Td \qquad \text{Eq. 1}$$

By default, data replication software compresses data before it is replicated. Thus, significant overhead time and resources may be consumed merely by compressing and decompressing data, which adds to the overall latency of replication.

Another problem with typical data replication software is that it does not have awareness or control of network resources when initializing mirror relationships and executing data replication transfers. Table 1 illustrates an example SnapMirror® command that can be used to "initialize" a SnapMirror® relationship say, for example, for a source volume "source_vol" containing video data having a source filer "filersrc" associated thereto. The "initialize" command is used to initiate a data replication transfer. The video data may be replicated to a destination volume "dest_vol" having a destination filer "filerdst" associated thereto.

TABLE 1 snapmirror intialize -S source_vol:filersrc -k 5120 -c scheme1 dest_vol:filerdst As the SnapMirror® command in TABLE 1 illustrates with a "-k" option, SnapMirror® replication software can throttle bandwidth (e.g., at 5120 kbps or 5 Mbps), or attempt to throttle bandwidth, per snapmirror relationship. However, the replication software does not have control over the network to actually ensure that the throttled bandwidth is achieved during a replication. Rather, it can just send more or less packets from the source filer interface in attempt to achieve the throttled bandwidth. Control by the replication software at the level of the source filer logical interface is not very efficient though. Further, if a transfer is in progress, the new throttle won't be implemented until the next update.

The SnapMirror® initialize command also illustrates that different compression schemes for different SnapMirror® relationships can also be applied using the "-c scheme1"

command line option. For instance, a more rigorous compression scheme for video data replication can be applied than for email related data etc.

As used herein in the present disclosure, the term "filer" may refer to a mechanism, function, device, etc. that can used to enable data replication activities. Generally, filers can receive/transmit data; repackage, compress or decompress data, monitor data replication, allocate data, partition data, packetize data, or perform other tasks associated with transmitting/receiving/storing data replication data. Filers can be source filers or destination filers. Filers can be implemented as FAS appliances or partitions of FAS appliances. Filers and/or FAS can serve storage over a network using various storage protocols such as Hypertext Transfer Protocol (HTTP), File Transfer Protocol (FTP), Trivial File Transfer Protocol (TFTP), Common Internet File System (CIFS), Network File System (NFS) or the like. Filers can be physical filers or virtual filers (vfilers) partitioned from physical filers.

In accordance with one embodiment, communication system 10 can overcome the aforementioned shortcomings (and others) by providing a mechanism to leverage the flexibility of SDN in order to efficiently replicate multiple volumes of data for different types of data by establishing SDN awareness for data replication application 26 and establishing data replication awareness for SDN controller 16. Making data replication application 26 SDN aware or establishing such awareness for data replication application 26 may provide data replication application 26 with the ability to interact with SDN controller 16 during data replication related activities as well as to send data replication policies to SDN controller 16. Making SDN controller 16 data replication aware or establishing such awareness for SDN controller 16 may provide SDN controller 16 with the ability to allocate network resources, including bandwidth for WAN 12, for data replication activities; to advise or control switches 24 to create/manage one or more logical network instances and to create/manage associated logical networks 32 in order to transmit different types of replication data in a manner that meets or satisfies SLA requirements associated with different data replication data types. In some embodiments, data replication awareness for SDN controller 16 may also provide SDN controller 16 with the ability to allocate WAN resources and create/manage one or more logical networks 32 and associated logical network instances according to one or more data replication modes that data replication application 26 may operate in during data replication activities.

Establishing awareness between SDN controller 16 and data replication application 26 and thus abstracting control of the data replication plane using SDN concepts effectively leverages the flexibility provided by software defined networks to achieve several benefits for data replication activities as well as WAN resource management activities. Such data replication benefits can including, increasing data replication performance and efficiency, maintaining proper service level agreement (SLA) compliance, proper Recovery Time Object (RTO) compliance and proper Recovery Point Objective (RPO) compliance for different mirror/replication relationships. Resource management benefits for WAN 12 can include proper utilization of WAN resources to increase network efficiency through management of WAN bandwidth.

Establishing SDN awareness for data replication software or applications, such as, for example data replication application 26 including API module 19b can be achieved using several processes. Establishing SDN awareness for data replication application 26 may allow proper rules to be applied by SDN controller 26 during data replication activities to achieve replication requirements associated with various data types.

In one embodiment, data replication application 26 may create multiple vfilers or vfiler instances on a source physical filer (e.g., source FAS 22a), which can be used to create volumes containing a particular type of data that can be used for creating a mirror relationship to replicate the particular type of data. For example a vfiler "A" may be used to create volumes containing video data and may be used for creating a mirror relationship to replicate video data. In another example, a vfiler "B" may be used for creating and replicating VM related data. Each vfiler may be configured to have its own distinct IP address associated thereto. The IP address can be used by SDN controller 16 to link one or more logical interfaces to a particular vfiler. In another embodiment, data replication application 26 may create multiple physical filers. For example, a physical filer "A" for video data, a physical filer "B" for VM data, a physical filer "C" for normal data, etc. Each physical filer may be configured to have its own physical interface and its own IP address. Data replication application 26 may create destination filers (e.g., vfilers, physical filers, etc.) on a destination physical filer (e.g., destination FAS 22b), which can be used to store volumes containing replication data for a particular type of data. Data replication application 26 may configure a unique IP address for each destination filer.

A plurality of mirror/replication relationships can be created on each source filer. Each mirror/replication relationship can include its one SLA, which can include RPO, RTO, latency requirements, capacity requirements, data type(s) and compression schemes for each relationship. Data replication application 26 may provide/publish its replication policies or requirements so that SDN controller 16 can read these policies and take necessary actions on behalf of the SDN aware data replication application 26 for one or more data replications. For example, the replication policies and/or business requirements at source FAS appliance 22a can be converted into networking problems, algorithms and/or rules which may ultimately be taken care of by one or more applications provisioned in SDN controller 16 to create and manage one or more logical networks/logical network instances in order to transmit data replication data in accordance with the replication policies and/or business requirements. Such applications can include a rules manager, a bandwidth manager, a logical network manager and a logical network server. Using functions/function calls that can be provided by the policy publish API, data replication application 26 can communicate the replication policies and/or business requirements to SDN controller 16. Providing/publishing can include pushing, sending or communicating replication policies and/or business requirements to SDN controller 16.

Replication policies may be defined or determined in a variety of ways for each of a particular type of data for a particular filer (vfiler or physical filer). For example, replication policies can include: a total number of mirror/replication relationships created on a filer (e.g., a vfiler "A" having an associated IP address 2.3.4.5); a total number of volumes to be replicated by the filer; a total latency requirements for replicating a particular type of data (e.g., video data); a compression type requirement for transmitting/replicating the particular type of data; bandwidth requirement for transmitting the particular type of video data from the filer; an RPO requirement for the particular data type; and an RTO for the particular data type. Policies may be written and published by data replication application 26 for each of a particular type of data that may be replicated using communication system 10.

In an illustrative example, a SnapMirror® relationship can be created using a SnapMirror® "on" command, which is different than the SnapMirror® "initialize" command that is used to initialize a replication transfer. Thus, a total number of mirror relationships can be determined for a particular source filer in order to determine an appropriate policy for the filer.

Establishing replication awareness for SDN controller 16 including API module 19a can be achieved using several processes. Making SDN controller 16 (e.g., software associated with SDN controller 16) effectively establishes how SDN controller 16 can advise or control switches 24 for one or more logical networks 32 when a particular type of data (e.g., video data, virtual machine data, document data, text data, etc.) is transmitted for replication activities. It should be understood that establishing replication awareness for SDN controller 16 should be performed before replication/data transmission.

SDN controller 16 may access replication policies published or sent by data replication application 26 running in source FAS appliance 22a in source data center 23a. Accessing the replication policies may establish replication awareness for SDN controller 16. SDN controller 16 may map the replication policies to network rules, algorithms, functions, etc. using the rules manager application. Thus, the network may have awareness of data replication application 26. Accessing can include receiving, retrieving, collecting, gathering, pulling, importing or any other type of mechanism that communicates the replication policies to SDN controller 16.

Based on the rules, SDN controller 16 may create pool of multiple virtual/logical network instances suitable for data replication as per each replication policy for each source filer. As noted previously, SDN controller 16 may create the logical network instances using the logical network manager application. Each logical network instances may have associated thereto: replication policies, including SLAs, one or more network rules configured by the rules manager application related to allocation of network resources, forwarding plane information for one or more switches 24, logical interface information, link information, combinations thereof or any other type of information related to managing logical networks for data replication activities. The forwarding plane information can include IP addresses, routing protocols, names, or other routing information for switches 24 and/or switch ports for routing replication data. Logical network instances may be stored in the logical network server application in SDN controller 16. During operation, SDN controller 16 may maintain the pool of logical networks 32/logical network instances using the logical network manager and the logical network server applications. Data replication application 26 may transmit the replication data through the logical networks 32. Maintaining can include ranking and sorting logical networks 32 based on their performance in meeting or failing to meet the rules for the replication policies and/or SLAs associated thereto.

SDN controller 16 may manage overall bandwidth for WAN 12 for virtual networks/logical networks that may be sliced from the physical network (e.g., WAN 12), which can be used to transmit replication data. SDN controller 16 can be configured to perform bandwidth slicing using the bandwidth manager application. Total WAN bandwidth (Wb) for WAN 12 can be represented as the sum of sliced bandwidth usage for each mirror relationship (expressed as "wn" for every 1–n mirror relationship) plus the bandwidth usage (W) of other network traffic that is not replication data, which can be expressed as:

$$(wb) = [w1 + w2 + w3 + \ldots wn] + W \qquad \text{Eq. 2}$$

Consider an example for a mirror relationship "R1." SDN controller 16 using the bandwidth manager application may determine the minimum bandwidth for mirror relationship R1 in order to meet the RPO requirement for R1. Say for example, the RPO of the mirror relationship R1→source filer (or vfiler)—destination filer (or vfiler) is 1 hour or 60 minutes, which means it can afford data loss for only 60 minutes and not beyond that. So the backup has to be done every hour. Assume, for example that the data created in one hour is 12000 MB then 12000 MB/hour is the transfer required or, in other words, that is the data that is to be replicated from source to destination, which equates to a transfer rate of 3.3 MB/sec ((12000 MB/hour)/(3600 sec/hour)=3.3 MB/sec). So for relationship R1, the bandwidth should be greater than 3.3 MB/sec or else the RPO for the mirror relationship will fail and thus fail to achieve its SLA.

Assume that, on an average, the data created per transaction for relationship R1 is expressed as "(x) MB", the RPO is expressed as "t_rpo" (in hours), on an average number of transactions during the RPO is expressed as "n_tr." Thus, the average data created during t_rpo equals (x*n_tr) MB. Hence (x*n_tr) MB of data needs to be replicated per t_rpo hour. Accordingly, the data replicated per second for mirror relationship R1 equals (x*n_tr/3600*t_rpo) MB/sec. So the minimum bandwidth w1 for R1 snapmirror relationship should be greater than or equal to (x*n_tr/3600*t_rpo) MB/sec. Such a mirror/replication level SLA requirement as shown for mirror relationship R1 may get mapped into suitable rules by SDN controller 16 using the rules manager application and may be executed by the bandwidth manager application to manage bandwidth for WAN 12. Using such operations, replication aware SDN controller 16 can distinguish/isolate normal data traffic with replication data traffic to perform bandwidth slicing and manage/allocate network resources for various activities, including data replication activities. Replication policies may be updated throughout operation depending on various types of data that may be replication.

Before initializing a replication transfer for a particular mirror/replication relationship (e.g., using a SnapMirror® "initialize" command using the SnapMirror® data replication software), data replication application 26, using functions/function calls that can be provided by a "bandwidth available API" provisioned in API modules 19a-b, can gain access to WAN 12 to first query SDN controller 16 for available bandwidth and if the bandwidth is present to meet the RPO for the particular mirror relationship, data replication application 26 may transmit the replication data for the relationship without first compressing the data. SDN controller 16 may communicate to data replication application 26 using the bandwidth available API whether bandwidth is available for the replication data associated with the relationship such that the data can be replicated without performing costly compression at the source and costly decompression at the destination thereby decreasing the overall replication latency. Thus, Tc and Td from Eq. 1 may effectively become zero by disabling compression at the source filer, which may provide a significant gain in decreasing the replication time Tr for the mirror relationship.

An example function that may be associated with the bandwidth available API is illustrated in APPENDIX A. SDN controller 16 can receive a query for available bandwidth for a particular mirror relationship. As illustrates in APPENDIX A, the query can include the SLA for the relationship. From the SLA, SDN controller 16 using the bandwidth manager application may determine a minimum bandwidth for the relationship (e.g., using an equation similar to that as shown above for relationship R1). By performing bandwidth slicing for data replication traffic and non-data replication traffic (e.g., normal traffic) within WAN 12, SDN controller 16 using the bandwidth manager application can determine available bandwidth for WAN 12 for transmitting replication data for the particular mirror relationship. The available bandwidth for WAN 12 may be compared to the minimum bandwidth for the mirror relationship to determine whether sufficient bandwidth for WAN 12 may be available for transmitting the replication data. If so, SDN controller 16 using the bandwidth manager application may return to data replication application 26, through the bandwidth available API, an indicator (e.g., "replicate_data_without_compression( )" as shown in APPENDIX A) indicating that replication may be performed for the mirror relationship without compressing the replication data. Upon receiving the indication, data replication application 26 may disable compression for the replication relationship. If bandwidth is not available for transmitting the replication data, SDN controller 16 using the bandwidth manager application may return to data replication application 26, through the bandwidth available API, an indicator (e.g., "replicate_data_with_compression( )" as shown in APPENDIX A) indicating that replication may be performed for the mirror relationship with compression of the replication data.

Even if bandwidth is not available for transmitting the replication data without compression, bandwidth slicing may still improve the allocation of resources for WAN 12 for transmitting replication data (compressed or uncompressed) through logical networks 32 sliced from WAN 12. Using the SnapMirror® command from Table 1 as an illustrative example, by implementing replication aware SDN controller 16 the bandwidth requirement of 5120 kbps or 5 Mbps for data compressed according to the compression scheme "scheme1" can be achieved in an efficient manner as replication aware SDN controller 16 may have a proper centralized network view and can perform WAN bandwidth slicing to accommodate the bandwidth requirement. Thus, replication aware SDN controller 16 may have more control over the replication data traffic thereby also controlling whether mirror replication data may be compressed or not. Recall, as noted previously, that by default, data replication software always compresses data at the source side.

In various embodiments, SDN controller 16 can also be made aware of different operating modes of data replication application 26 in order to create and manage logical networks/logical network instances and allocate resources for such networks using bandwidth slicing. API modules 19a-b can be provisioned with a "mode update API" that can be configured to provide operating mode information from data replication application 26 to SDN controller 16. For example, by using functions/function calls that can be provided by the mode update API, SDN controller 16 can determine what type of network may be needed if data replication application 26 is in an synchronous mode with a near zero RPO requirement (e.g., less than a minute), whether it is in a semi-synchronous mode with an RPO in minutes or whether it is in an asynchronous mode with any RPO requirement.

SDN controller 16 may map the modes to network rules, which can executed to create one or more logical network instances realizable through logical networks 32. For example, for the synchronous mode, which may have a near zero RPO (e.g., less than a minute), SDN controller 16 using the rules manager application may map the mode to a set of network rules (e.g., low latency or high latency path, bandwidth requirement, etc.) which can be executed by the logical network manager to create a logical network instance according to the rules. For the semi-synchronous mode, which may have an RPO in minutes, SDN controller 16 using the rules manager application may map the mode to another set of network rules (e.g., low latency or high latency path, bandwidth requirement, etc.) which can be executed by the logical network manager to create a logical network instance according to the rules. Similarly, for the asynchronous mode, which may have any RPO, SDN controller 16 using the rules manager application may map the mode to yet another set of network rules (e.g., low latency or high latency path, bandwidth requirement, etc.) which can be executed by the logical network manager to create a logical network instance according to the rules.

In an embodiment, API modules 19a-b can be provisioned with a "relationship update API" that can be configured to provide relationship/mirror information to SDN controller 16 from data replication application 26. For any mirror relationship that is broken or if any mirror relationship is created then such information can be communicated to SDN controller 16 using one or more functions/function calls that may be provided by the relationship update API.

During data replication activities, several processes may be performed by SDN controller 16 and data replication application 26 using one or more functions/function calls that may be provided by one or more APIs configured in API modules 19a-b as well as using applications provisioned in SDN controller 16 to facilitate data replication through logical networks 32. In an embodiment, API modules 19a-b may be provisioned with a "monitor replication API" that can be configured with one or more functions/function calls to provide information related to various replication activities to SDN controller 16 that may be performed by data replication application 26 for replicating data between source FAS 22a and destination FAS 22b. Such awareness may provide SDN controller 16 with the ability to efficiently manage resources for WAN 12 (e.g., bandwidth) as well as manage logical networks/logical network instances to meet the replication policies for replication traffic.

For example, functions/function calls that can be provided by the monitor replication API can be used to monitor "initialize" commands (e.g., SnapMirror® "initialize" commands) that may be performed by data replication application 26. During replication/data transmission activities, the functions/function calls that can be provided by the monitor replication API can be used by SDN controller 16 to check the pool of logical network instances suitable for replication for the data as per the replication policy for the source filer associated with the replication. If a logical network instance is available in the pool, SDN controller 16 may make arrangements to transmit the data via the logical network instance by controlling the forwarding plane in switches 24 to create/establish a logical network associated with the logical network instance. By controlling the forwarding plane, SDN controller may control a path for routing for replication data through switches 24 for a logical network. If a logical network instance is not available, SDN controller 16 may create a virtual/logical network instance suitable for data replication and may make arrangements to transmit the data in a logical network that may be created from the logical network instance (e.g., controlling the forwarding plane in switches 24 to route data according to a corresponding logical network path).

SDN controller 16, using the logical network manager may access one or more WAN applications, such as a network manager application, which may maintain domain information for switches 24, in order to execute control of the forwarding planes and/or rules on switches 24. An exemplary set functions associated with controlling forwarding planes for switches 24 is provided in APPENDIX B. Various WAN applications may include, but not be limited to, a network manager application, a name server application and/or a domain server application.

In an embodiment, SDN controller 16, using the logical network manager application, may also update and maintain a ranking table to rank and sort logical networks 32 based on their performance in relation to whether or not each logical network 32 succeeded in meeting its associated replication policies per the networking rules associated with the logical networks that were created from the associated policies.

Each FAS appliance 22*a-b* can be provisioned with a physical interface through which data replication traffic may travel. The physical interfaces can be implemented as Ethernet cards, which can be logically sliced to create one or more logical interfaces, which can be used to link source and destination filers (based on their corresponding IP addresses) to logical networks 32. The logical interfaces may provide a mechanism to optimize connections for the logical networks 32 to the source and destination filers.

Turning to the infrastructure of communication system 10, the network topology can include any number of servers, virtual machines, switches (including distributed virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications.

Additionally, any one or more of these elements may be combined or removed from the architecture based on particular configuration needs. Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration. Moreover, communication system 10 can include any number of spine switches, leaf switches, and servers, within the broad scope of the present disclosure.

The example network environment may be configured over a physical infrastructure that may include one or more networks and, further, may be configured in any form including, but not limited to, LANs, wireless local area networks (WLANs), VLANs, SANs, metropolitan area networks (IMANs), virtual private networks (VPNs), Intranet, Extranet or any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof that can permit lossless data transmission as designated in the WAN. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/ or through any additional networks such as a wide area networks (e.g., the Internet).

Figure 2:
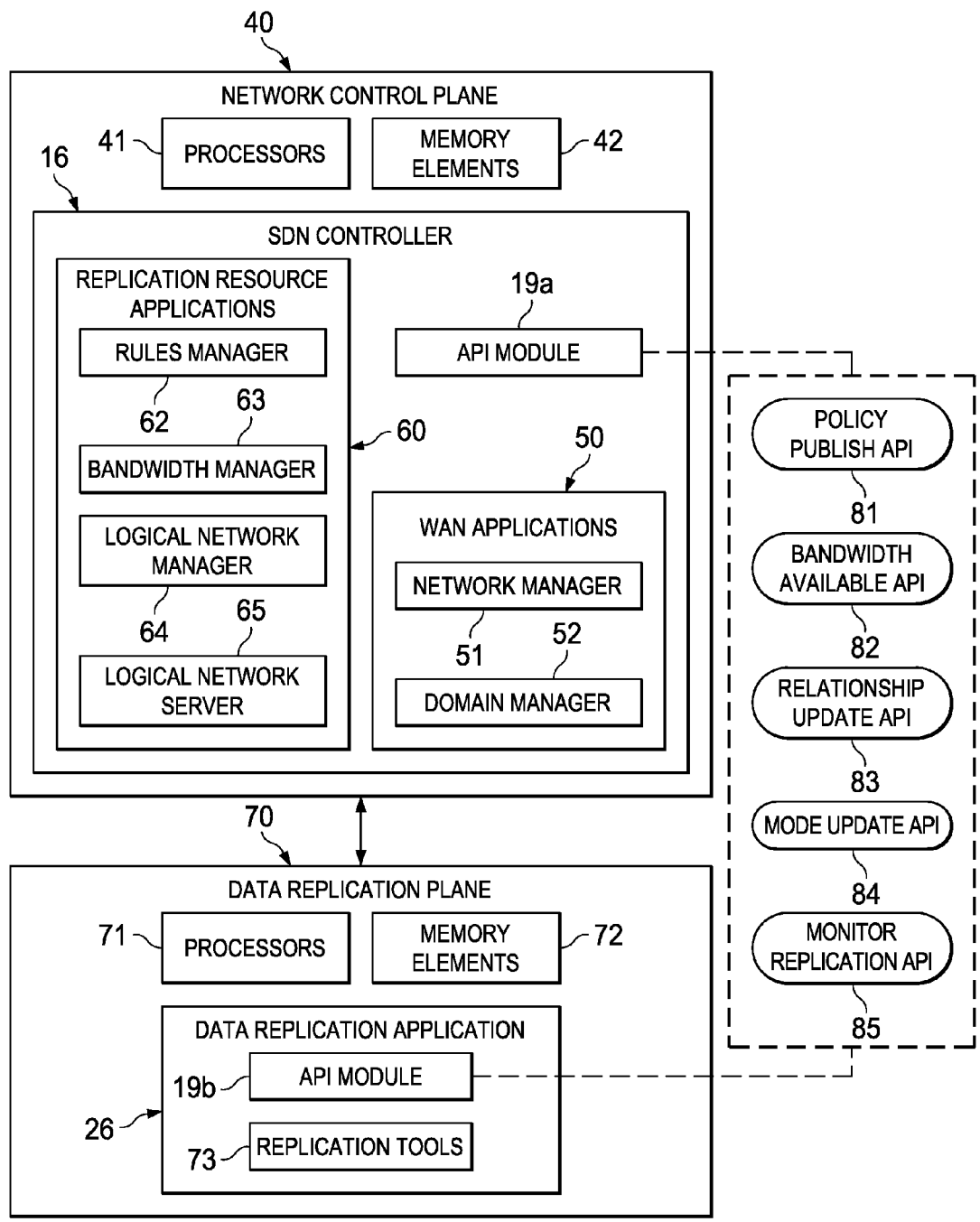
FIG. 2 is a simplified block diagram illustrating example details of the communication system in accordance with one embodiment of the communication system.

Turning to FIG. 2, FIG. 2 is a simplified block diagram illustrating example details of a logical view according to an embodiment of communication system 10. Control of WAN 12 for data replication activities may be abstracted to a network control plane 40, while control for various data replication activities including, but not limited to, filer creation, data compression, replication management, etc. may remain within a data replication plane 70.

Network control plane 40 may include processors 41 and memory elements 42 to facilitate activities and operations described herein in the present disclosure. SDN controller 16 may operate in network control plane 40. SDN controller 16 can be provisioned with API module 19*a*, replication resource applications 60 and WAN applications 50. Replication resource applications 60 and WAN applications 50 may interface with each other as well as with one or more APIs provided by API module 19*a* to facilitate various tasks, operations, processes, functions, etc. as described herein in the present disclosure. Furthermore, SDN controller 16 described and shown herein (and/or its associated structures) may also include suitable interfaces for receiving, transmitting, and/or otherwise communicating data or information in a network environment.

Replication resource applications 60 can include a rules manager 62, a bandwidth manager 63, a logical network manager 64 and a logical network server 65. Rules manager 62 may facilitate creating network rules, algorithms, functions, etc. based on one or more replication policies, one or more SLAs, one or more data replication application 26 operation modes and/or one or more bandwidth requirements for one or more mirror/replication relationships.

Bandwidth manager 63 may facilitate bandwidth slicing of WAN 12 for one or more replication relationships according to rules created by rules manager 62, based on bandwidth slices allocated to other replication relationships and based on bandwidth consumed by non-data replication traffic (e.g., normal data traffic, data traffic related to the operation of applications 18, etc.). Logical network manager 64 may facilitate creating, managing, maintaining, monitoring, ranking and/or sorting one or more logical network instances and associated logical networks 32. Logical network manager 64 may interface with rules manager 62, bandwidth manager 63 and logical network server 65 to facilitate the aforementioned activities. Logical network server 65 may facilitate storage of logical network instances and data or information that may be associated thereto including, but not limited to, replication policies, including SLAs, one or more network rules configured by rules manager 62 related to allocation of network resources, forwarding plane information for one or more switches 24, logical interface information, link information, combinations thereof or any other type of information related to managing logical networks for data replication activities.

WAN applications 50 can include a network manager 51 and a domain manager 52. Network manager 51 can manage WAN resources in combination with logical network manager 64 to facilitate efficient allocation of network resources, including switches 24, as well as controlling/setting forwarding planes for switches 24. Domain manager 52 can assign a unique domain ID per switch 24. Each server or storage device logging into a switch 24, including logical devices (e.g., logical interfaces) may be assigned an address including the domain ID of the switch 24, which may aid in controlling forwarding planes for switches 24.

Data replication plane 70 may include processors 71 and memory elements 72 to facilitate activities and operations described herein in the present disclosure. Data replication application 26 can operate in data replication plane 70. Data replication application 26 can be provisioned with API module 19b and replication tools 73. Replication tools 73 can provide functions, applications, modules, etc. to facilitate replication data from source FAS 22a to destination FAS 22b. In various embodiments, replication tools 73 may be provided by a third party data replication software vendor, such as, for example SnapMirror® by NetApp®. One or more APIs provisioned in API module 19b can interface with replication tools 73 to facilitate various tasks, operations, processes, functions, etc. described herein in this Specification.

API modules 19a-b may also be used to provide interfacing between SDN controller 16 and data replication application 26 such that SDN awareness can be established for data replication application 26 and data replication awareness can be established for SDN controller 16. Note that an "application" and/or "API" as used herein in this Specification, can be inclusive of an executable file comprising instructions that can be understood and processed on a computer, and may further include library modules loaded during execution, object files, system files, hardware logic, software logic, or any other executable modules.

API modules 19a-b may include a policy publish API 81, a bandwidth available API 82, a relationship update API 83, a mode update API 84 and a monitor replication API 85. Policy publish API 81 may include functions and function calls, sometimes referred to as a "library," to facilitate activities associated with publishing policies for filers and mirror/replication relationships. Bandwidth available API 82 may include a library of functions and function calls to facilitate activities associated with determining an available WAN 12 bandwidth for a particular mirror/replication relationship given a corresponding SLA for the mirror/replication relationship. Relationship update API 83 may include a library of functions and function calls to facilitate activities associated with updating SDN controller 16 with information related to new mirror/replication relationships being created as well as mirror/replication relationships being broken. Monitor replication API 85 may include a library of functions and function calls to facilitate activities associated with SDN controller 16 monitoring replication activities performed by data replication application 26 and/or one or more replication tools 73 that may be included therein. The monitoring may be performed in order to make appropriate arrangements with switches 24 for logical networks (as determined from the associated logical network instances) for the replication of different types of data from source FAS 22a (e.g., source filers) to destination FAS 22b (e.g., destination filers).

In some embodiments, API modules 19a-b may both include functions and function calls to the policy publish API 81, the bandwidth available API 82, the relationship update API 83, the mode update API 84 and the monitor replication API 85. In another embodiment, API module 19a may include functions and function calls to the policy publish API 81, the bandwidth available API 82, the relationship update API 83, the mode update API 84 and the monitor replication API 85, while API module 19b may only include function calls to the corresponding functions. In such an embodiment, networking vendors could augment the APIs in networking equipment and expose the APIs for use by data replication applications/software by exposing the function calls to API module 19b for the functions included in API module 19a. By exposing only function calls to API module 19b, networking vendors may protect network specific protocol information, topology information or the like. In yet another embodiment, certain functions and function calls may be local to API module 19a while its local function calls may be exposed to API module 19b and, additionally, certain functions and function calls may be local to API module 19b while its local function calls may be exposed to API module 19a. In this manner, networking vendors and data replication software vendors could expose only certain information, while protecting other business specific information.

Figure 3:
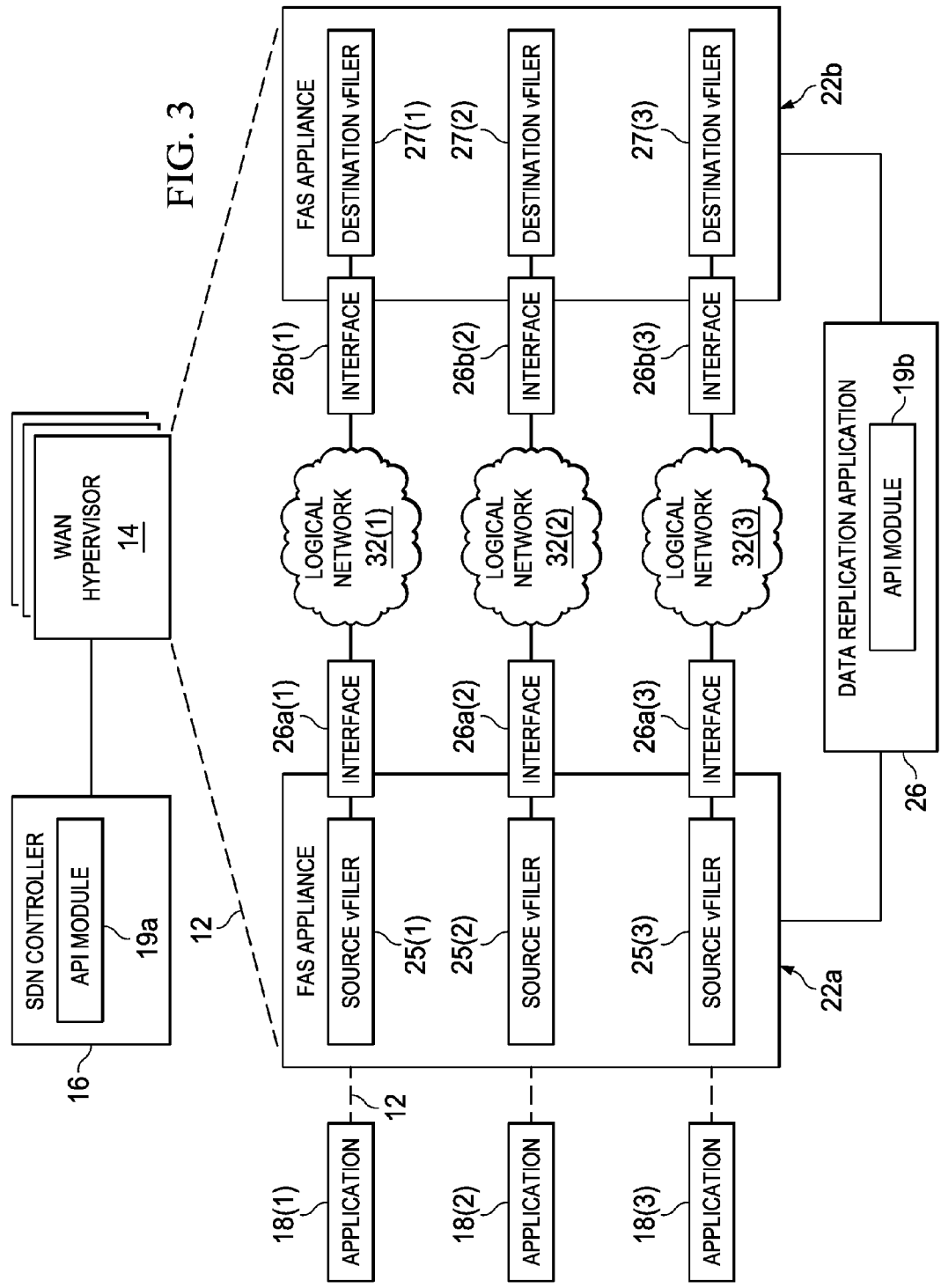
FIG. 3 is a simplified block diagram illustrating other example details of the communication system in accordance with one embodiment of the communication system.

Turning to FIG. 3, FIG. 3 is a simplified block diagram illustrating other example details of the communication system 10 in accordance with one embodiment of the communication system. FIG. 3 includes WAN 12 (represented by dashed lines), WAN hypervisor 14, SDN controller 16, data replication application 26, API modules 19a-b, applications 18(1)-18(3), source FAS appliance 22a, destination FAS appliance 22b and a set of logical networks 32(1)-32(3). Source FAS appliance 22a includes a set of source vfilers 25(1)-25(3). Destination FAS appliance 22b includes a set of destination vfilers 27(1)-27(3).

Further shown in FIG. 3, a set of source logical interfaces 26a(1)-26a(3) may connect each respective source vfiler 25(1)-25(3) to each respective logical network 32(1)-32(3). Connection for the source logical interfaces 26a(1)-26a(3) may be facilitated using a corresponding IP address for each source vfiler 25(1)-25(3). Similarly, a set of destination logical interfaces 26b(1)-26b(3) may connect each respective destination filer 27(1)-27(3) to each respective logical network 32(1)-32(3). Connection for each destination logical interface 26b(1)-26b(3) may be facilitated using a corresponding IP address for each destination vfiler 27(1)-27(3).

Logical network 32(1) may be used for transmitting replication data associated with application 18(1). Say, for example, application 18(1) may be a video application. Logical network 32(2) may be used for transmitting replication data associated with application 18(2). Say, for example, application 18(2) may be associated with a virtual machine application. Logical network 32(3) may be used for transmitting replication data associated with application 18(3). Say, for example, application 18(3) may be associated with a document application.

Logical network manager 64 in SDN controller may configure logical networks 32(1)-32(3) by controlling forwarding planes for switches 24 using associated logical network instances, which may be stored in logical network server 65. Logical network manager 64 may interface with network manager 51 to control the forwarding planes. Performance of the logical networks 32(1)-32(3) may be monitored by logical network manager 64 to determine whether or not each logical network 32(1)-32(3) meets its corresponding replication policies per rules configured by rules manager 62 that may be associated with the replication policies for each source vfiler 25(1)-25(3). Logical network server 65 may rank logical networks 32(1)-32(3) according to their performance. Bandwidth for logical networks 32(1)-32(3) may be sliced from WAN 12 bandwidth using bandwidth manager 63. Bandwidth manager 63 may determine if there is available WAN 12 bandwidth to transmit replication data for a particular logical network based on a replication relationship for the network, say for example, logical network 32(2) in order to transmit video replication data through the logical network without compressing/decompressing the data.

Figure 4:
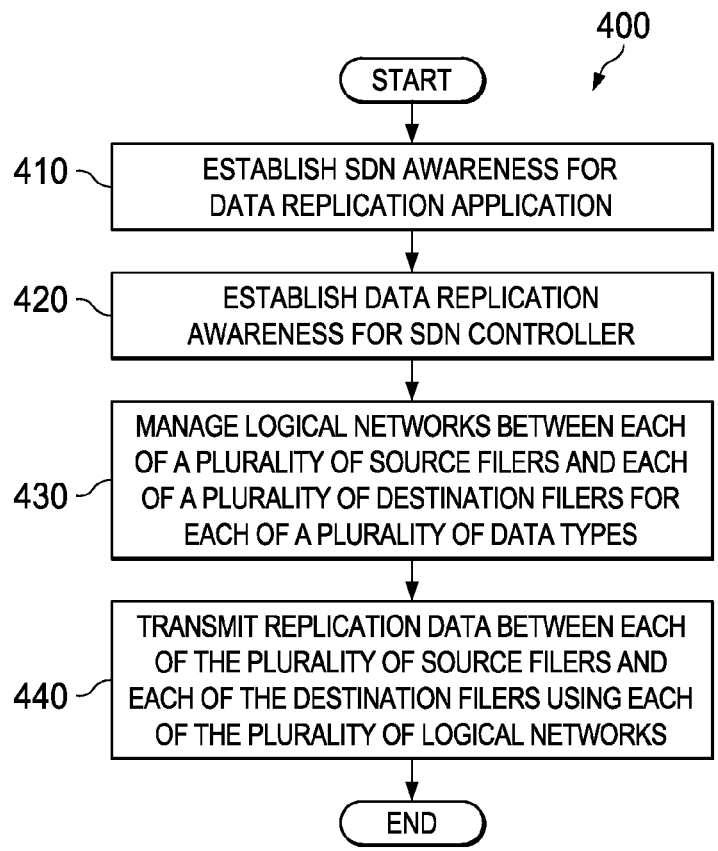
FIG. 4 is a simplified flow diagram illustrating example operations in accordance with one embodiment of the communication system.

Turning to FIG. 4, FIG. 4 is a simplified flow diagram 400 illustrating example operations in accordance with one embodiment of the communication system 10. At 410, SDN awareness for data replication application 26 may be established. At 420, data replication awareness for SDN controller 16 may be established. At 430, a plurality of logical networks (e.g., logical networks 32) may be managed in WAN 12 between each of a plurality of source filers and each of a plurality of destination filers for each of a plurality of data types by the data replication aware SDN controller. Each logical network may be associated with a replication policy for a corresponding source filer. Each logical network may be connected to a corresponding source filer through a logical interface (e.g., logical interfaces 26a(1)-26a(3)). In various embodiments, SDN controller 16 having data replication awareness may manage the logical networks using rules manager 62, bandwidth manager 63, logical network manager 64 and logical network server 65. In an embodiment, logical network server 65 may include a logical network instance for a corresponding logical network. The managing may include controlling a forwarding plane for switches 24 to transmit replication data for a corresponding logical network.

Figure 5:
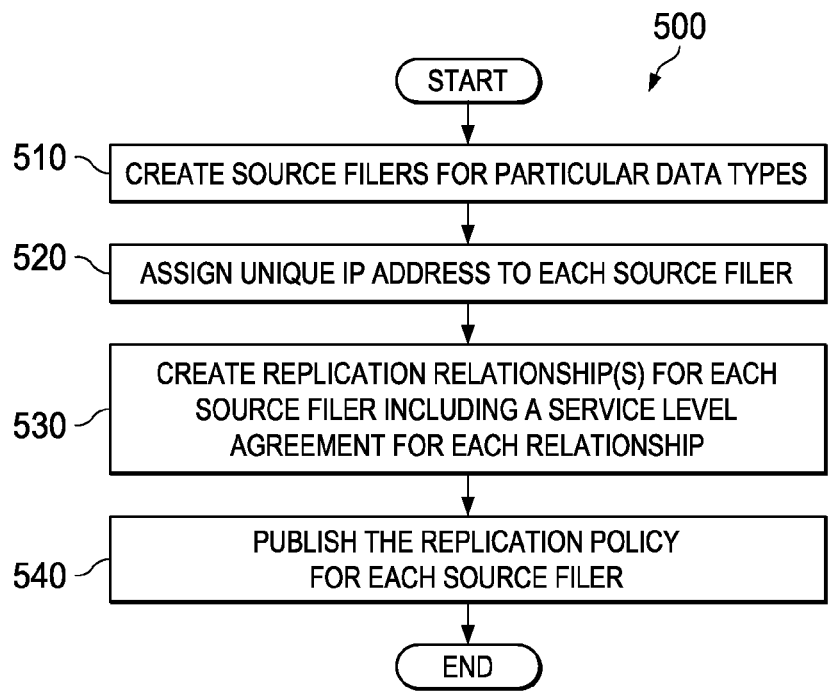
FIG. 5 is a simplified flow diagram illustrating example operations associated with establishing SDN awareness for a data replication application in accordance with one embodiment of the communication system.

Turning to FIG. 5, FIG. 5 is a simplified flow diagram 500 illustrating example operations associated with establishing SDN awareness for data replication application 26 in one example operation of communication system 10. At 510, a plurality of source filers may be created on source FAS 22a for each data type. The source filers can be vfilers (e.g., source vfilers 25(1)-25(3)) or physical filers. At 520, a unique IP address may be assigned to each source filer. At 530, one or more replication relationships may be created for each source filer using data replication application 26. Each replication relationship may include an associated SLA including an RPO and RTO. At 540, data replication application 26 may publish the replication policy for each source filer. In an embodiment, data replication application 26 may publish the replication policy for each source filer using functions and/or function calls that may be provided by policy publish API 81.

Figure 6:
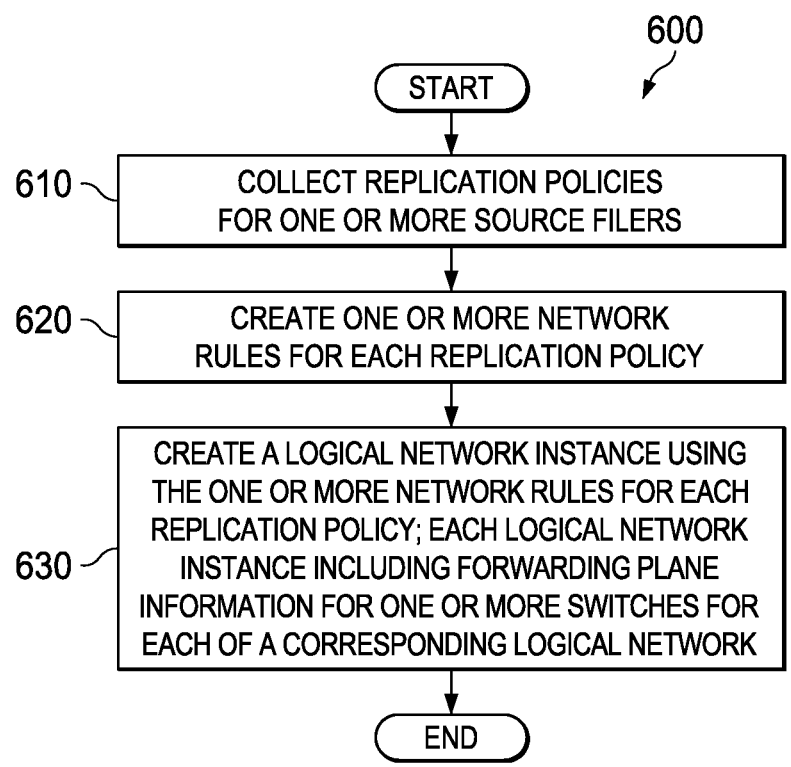
FIG. 6 is a simplified flow diagram illustrating example operations associated with establishing data replication awareness for an SDN controller in accordance with one embodiment of the communication system.

Turning to FIG. 6, FIG. 6 is a simplified flow diagram 600 illustrating example operations associated with establishing data replication awareness for SDN controller 16 in one example operation of communication system 10. At 610, SDN controller 26 may collect published replication policies for one or more source filers. At 620, SDN controller 26 may create one or more network rules using each replication policy. In various embodiments, SDN controller 26 may collect published replication policies and create the one or more network rules using rules manager 62. At 630, SDN controller 26 may create a logical network instance using the one or more network rules for each replication policy. Each logical network instance may include at least forwarding plane information for a plurality of switches (e.g., routing information for switches 24 in WAN 12) for each of a corresponding logical network realized from the corresponding logical network instance.

Figure 7:
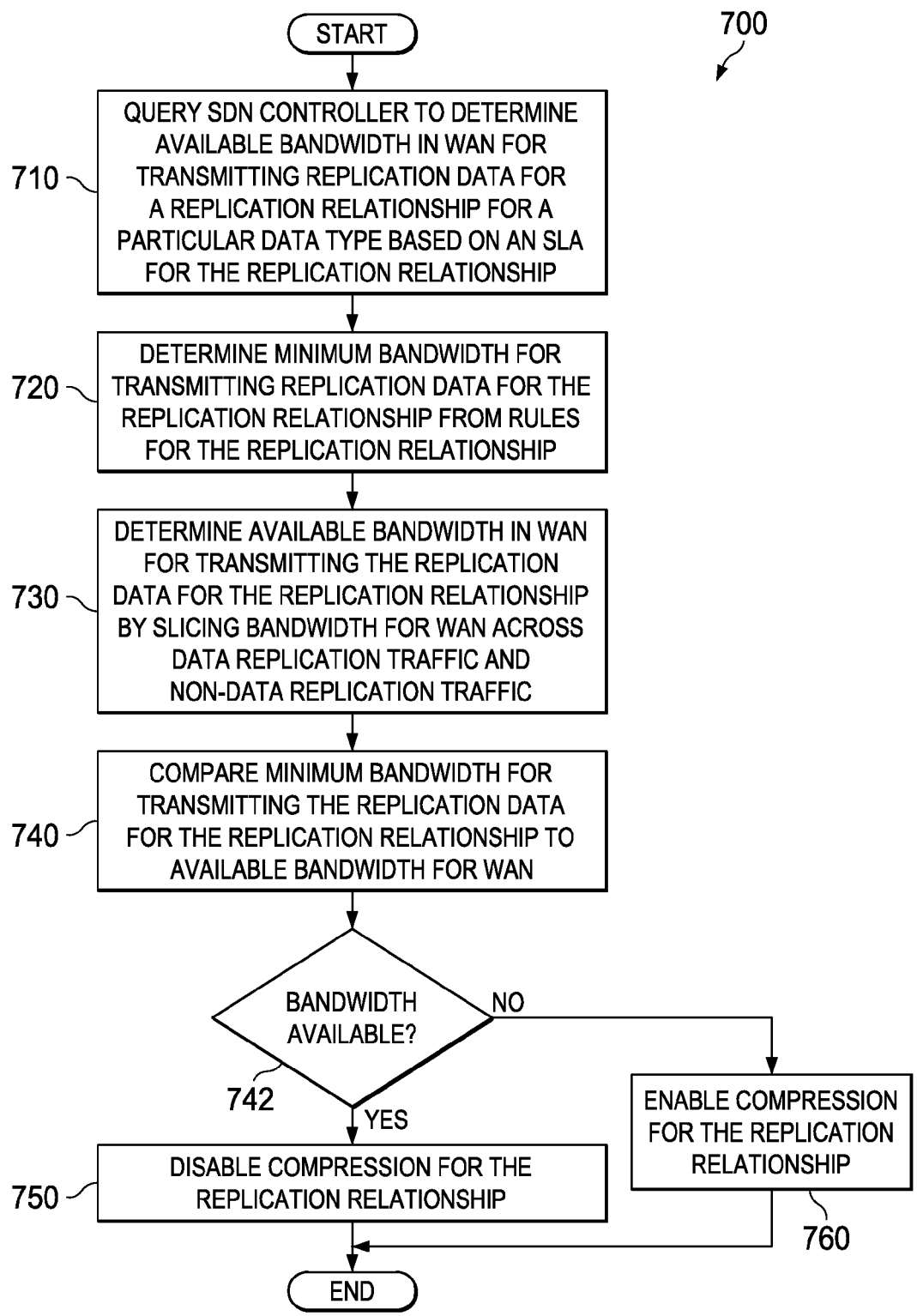
FIG. 7 is a simplified flow diagram illustrating example operations associated with determining available bandwidth for transmitting replication data for a particular data type in accordance with one embodiment of the communication system.

Turning to FIG. 7, FIG. 7 is a simplified flow diagram 700 illustrating example operations associated with determining available bandwidth for transmitting replication data for a particular data type in one example operation of communication system 10. At 710, SDN controller 16 having data replication awareness may be queried by data replication application 26 to determine available bandwidth in WAN 12 for transmitting replication data for a replication relationship for a particular data type. In an embodiment, one or more functions and/or function calls that may be provided by bandwidth available API 82 may be used to perform the query. The query may include an SLA for the replication relationship for the particular data type. At 720, SDN controller 16 using bandwidth manager 63, which may interface with rules manager 62, may determine a minimum bandwidth for the replication data based on the rules stored in rules manager 62 for the replication relationship.

At 730, SDN controller 16 using bandwidth manager 63 may determine available bandwidth in WAN 12 for transmitting the replication data for the replication relationship by slicing bandwidth for WAN 12 across data replication traffic and non-data replication traffic. At 740, SDN controller 16 using bandwidth manager 63 may compare the minimum bandwidth for transmitting the replication data for the replication relationship to the available bandwidth for WAN 12 to determine at 742 whether bandwidth is available in WAN 12 for the replication data. If so, data replication application 26 may disable compression for the replication data for the replication relationship at 750. If not, data replication application 26 may enable compression for the replication data for the replication relationship at 760. In an embodiment, SDN controller 16 may communicate to data replication application 26 whether or not bandwidth is available in WAN 12 using a return call for bandwidth available API 82.

In regards to the internal structure associated with communication system 10, one or more memory elements (e.g., memory elements 42 and 72) can store data used for the operations described herein. This includes any suitable memory element [random access memory (RAM), read only memory (ROM), an erasable programmable read only memory (EPROM), an electrically erasable programmable ROM (EEPROM), etc.], software, hardware, or in any other suitable component, device, element, or object where appropriate and based on particular needs. Any of the memory items discussed herein should be construed as being encompassed within the broad term 'memory element.' The information being monitored, sent or received could be provided in any database, register, control list, cache, or storage structure: all of which can be referenced at any suitable timeframe. Any such storage options may be included within the broad term 'memory element' as used herein in this Specification.

Similarly, any of the potential processors (e.g., processors 41 and 71) processing elements, modules, and machines described in this Specification should be construed as being encompassed within the broad term 'processor.' A processor can execute any type of instructions associated with the data to achieve the operations detailed herein in this Specification. Each of the network elements can also include suitable interfaces for receiving, transmitting, and/or otherwise communicating data or information in a network environment.

Additionally, some of the processors and memory elements may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

Note that in certain example implementations, the data replication functions, function calls, APIs, applications, etc. outlined herein may be implemented by logic encoded in one or more tangible media, which may be inclusive of non-transitory media (e.g., embedded logic provided in an application specific integrated circuit [ASIC], digital signal processor [DSP] instructions, software [potentially inclusive of object code and source code] to be executed by a processor, or other similar machine, etc.). In some of these instances, memory elements [e.g., memory elements 42 and 72] can store data used for the operations described herein. This includes the memory elements being able to store software, logic, code, or processor instructions that are executed to carry out the activities described in this Specification. A processor can execute any type of instructions associated with the data to achieve the operations detailed herein in this Specification. In one example, the processors [e.g., processors 41 and 71] could transform an element or an article (e.g., data) from one state or thing to another state or thing. In another example, the data replication activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an EPROM, an EEPROM) or an ASIC that includes digital logic, software, code, electronic instructions, or any suitable combination thereof.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and further can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the previously described activities illustrate only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, and signaling protocols, communication system 10 may be applicable to other exchanges, routing protocols, or routed protocols in which in order to provide data replication activities to a network. Moreover, although communication system 10 has been illustrated with reference to particular elements and operations that facilitate data replication processes, these elements and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

APPENDIX A

```
if( API_bandwidth_available
(input: mirror relationship -> X-Y, input: SLA_array[ ]) )
then replicate_data_without_compression( )
else
replicate_data_with_compression( )
fi
```

APPENDIX B

```
if (data_from_vfilerA)
then
use_route_xyz( ) /* low latency route */
fi
if (data_from_vfilerB)
then
use_route_abc( ) /* High capacity route */
fi
if (data_from_vfilerC)
then
use_route_def( ) /* Low priority or high latency route */
fi
```

What is claimed is:

1. A method, comprising:
   establishing software defined network (SDN) awareness for a data replication application, wherein the establishing comprises creating each of a plurality of source filers, assigning an Internet Protocol (IP) address to each source filer, creating one or more replication relationships for each source filer and publishing a replication policy for each source filer;
   establishing data replication awareness for a SDN controller;
   managing a plurality of logical networks in a wide area network (WAN) between each of the plurality of source filers and each of a plurality of destination filers for each of a plurality of data types by the SDN controller having data replication awareness, wherein each logical network is associated with a corresponding replication policy for a corresponding source filer and is connected to the corresponding source filer through a logical interface; and transmitting replication data between each of the plurality of source filers and each of the plurality of destination filers using each of the plurality of logical networks.

2. The method of claim 1,
wherein each source filer is associated with a particular data type
and wherein each replication relationship includes a Service Level Agreement (SLA) and wherein the SLA includes a Recovery Point Objective (RPO) and a Recovery Time Objective (RTO) and
wherein the corresponding replication policy for each corresponding source filer includes a total number of replication relationships on the corresponding source filer, a total number of volumes to be replicated, a total latency requirement, a compression type, a bandwidth requirement, the RPO, and the RTO.

3. The method of claim 2, wherein the establishing data replication awareness for the SDN controller further comprises:
collecting each replication policy for each of the plurality of source filers;
creating one or more network rules for each replication policy; and
creating a logical network instance using the one or more network rules for each replication policy for each source filer, wherein each logical network instance comprises forwarding plane information for each of a plurality of switches for each of the plurality of logical networks.

4. The method of claim 1, further comprising:
querying the SDN controller to determine available bandwidth in the WAN for transmitting replication data for a replication relationship for a particular data type, wherein the query includes a service level agreement (SLA) for the replication relationship;
determining a minimum bandwidth for the replication data from the SLA;
determining available bandwidth in the WAN for transmitting the replication data for the particular data type by slicing bandwidth for the WAN across data replication traffic and non-data replication traffic;
comparing the minimum bandwidth for the replication data to the available bandwidth in the WAN to determine whether bandwidth is available in the WAN for transmitting the replication data;
if bandwidth is available in the WAN, disabling compression for the replication data to be transmitted using a particular logical network; and
if bandwidth is not available in the WAN, enabling compression for the replication data to be transmitted using the particular logical network.

5. The method of claim 1, wherein the plurality of source filers and the plurality of destination filers are at least one of:
a virtual filer; and
a physical filer.

6. The method of claim 1, further comprising:
controlling a forwarding plane for each of a plurality of switches in the WAN for each of the plurality of logical networks between a particular source filer and a particular destination filer.

7. The method of claim 1, further comprising:
creating logical networks based on a plurality of replication operating modes defined by the data replication application.

8. The method of claim 7, wherein the plurality of replication operating modes include at least one of:

a synchronous mode, wherein the synchronous mode includes a Recovery Point Objective (RPO) defined at less than a minute;
a semi-synchronous mode, wherein the semi-synchronous mode includes an RPO defined in one or more minutes; and
an asynchronous mode, wherein the asynchronous mode includes an RPO defined in at least one of: less than a minute; and one or more minutes.

9. The method of claim 1, wherein the managing the plurality of logical networks further comprises:
monitoring the plurality of logical networks according to the replication policies for each logical network;
ranking the logical networks based on whether each network meets its corresponding replication policies; and
sorting the plurality of logical networks based on the ranking.

10. The method of claim 1, wherein the SDN controller includes an application selected from a group consisting of: rules manager, bandwidth manager, logical network manager, and logical network server.

11. One or more non-transitory tangible media encoding logic that include instructions for execution that, when executed by a processor, is operable to perform operations comprising:
establishing software defined network (SDN) awareness for data replication application, wherein the establishing comprises creating each of a plurality of source filers, assigning an Internet Protocol (IP) address to each source filer, creating one or more replication relationships for each source filer and publishing a replication policy for each source filer;
establishing data replication awareness for a SDN controller;
managing a plurality of logical networks in a wide area network (WAN) between each of the plurality of source filers and each of a plurality of destination filers for each of a plurality of data types by the SDN controller having data replication awareness, wherein each logical network is associated with a corresponding replication policy for a corresponding source filer and is connected to the corresponding source filer through a logical interface; and
transmitting replication data between each of the plurality of source filers and each of the plurality of destination filers using each of the plurality of logical networks.

12. The media of claim 11,
wherein each source filer is associated with a particular data type
and wherein each replication relationship includes a Service Level Agreement (SLA) and wherein the SLA includes a Recovery Point Objective (RPO) and a Recovery Time Objective (RTO) and
wherein the corresponding replication policy for each corresponding source filer includes a total number of replication relationships on the corresponding source filer, a total number of volumes to be replicated, a total latency requirement, a compression type, a bandwidth requirement, the RPO, and the RTO.

13. The media of claim 12, wherein the establishing data replication awareness for the SDN controller further comprises:
collecting each replication policy for each of the plurality of source filers;
creating one or more network rules for each replication policy; and creating a logical network instance using the one or more network rules for each replication policy for each source filer, wherein each logical network instance comprises forwarding plane information for each of a plurality of switches for each of the plurality of logical networks.

14. The media of claim 11, wherein the operations further comprise:
querying the SDN controller to determine available bandwidth in the WAN for transmitting replication data for a replication relationship for a particular data type, wherein the query includes a service level agreement (SLA) for the replication relationship;
determining a minimum bandwidth for the replication data from the SLA;
determining available bandwidth in the WAN for transmitting the replication data for the particular data type by slicing bandwidth for the WAN across data replication traffic and non-data replication traffic;
comparing the minimum bandwidth for the replication data to the available bandwidth in the WAN to determine whether bandwidth is available in the WAN for transmitting the replication data;
if bandwidth is available in the WAN, disabling compression for the replication data to be transmitted using a particular logical network; and
if bandwidth is not available in the WAN, enabling compression for the replication data to be transmitted using the particular logical network.

15. The media of claim 11, wherein the operations further comprise:
controlling a forwarding plane for each of a plurality of switches in the WAN for each of the plurality of logical networks between a particular source filer and a particular destination filer.

16. The media of claim 11, wherein the operations further comprise:
monitoring the plurality of logical networks according to the replication policies for each logical network;
ranking the logical networks based on whether each network meets its corresponding replication policies; and
sorting the plurality of logical networks based on the ranking.

17. The media of claim 11, wherein the SDN controller includes an application selected from a group consisting of: rules manager, bandwidth manager, logical network manager, and logical network server.

18. An apparatus, comprising:
a memory element for storing data; and
a processor that executes instructions associated with the data, wherein the processor and the memory element cooperate such that the apparatus is configured for:
establishing software defined network (SDN) awareness for data replication application, wherein the establishing comprises creating each of a plurality of source filers, assigning an Internet Protocol (IP) address to each source filer, creating one or more replication relationships for each source filer and publishing a replication policy for each source filer;
establishing data replication awareness for a SDN controller;
managing a plurality of logical networks in a wide area network (WAN) between each of the plurality of source filers and each of a plurality of destination filers for each of a plurality of data types by the SDN controller having data replication awareness, wherein each logical network is associated with a corresponding replication policy for a corresponding source filer and is connected to the corresponding source filer through a logical interface; and
transmitting replication data between each of the plurality of source filers and each of the plurality of destination filers using each of the plurality of logical networks.

19. The apparatus of claim 18,
wherein each source filer is associated with a particular data type
and wherein each replication relationship includes a Service Level Agreement (SLA) and wherein the SLA includes a Recovery Point Objective (RPO) and a Recovery Time Objective (RTO) and
wherein the corresponding replication policy for each corresponding source filer includes a total number of replication relationships on the corresponding source filer, a total number of volumes to be replicated, a total latency requirement, a compression type, a bandwidth requirement, the RPO, and the RTO.

20. The apparatus of claim 19, wherein the establishing data replication awareness for the SDN controller includes:
collecting each replication policy for each of the plurality of source filers;
creating one or more network rules for each replication policy; and
creating a logical network instance using the one or more network rules for each replication policy for each source filer, wherein each logical network instance comprises forwarding plane information for each of a plurality of switches for each of the plurality of logical networks.

* * * * *